(12) United States Patent
Wang et al.

(10) Patent No.: US 11,289,286 B2
(45) Date of Patent: Mar. 29, 2022

(54) KEY STRUCTURE

(71) Applicants: LITE-ON ELECTRONICS (GUANGZHOU) LIMITED, Guangzhou (CN); Lite-On Technology Corporation, Taipei (TW)

(72) Inventors: En-Huei Wang, Taipei (TW); Cheng-Kun Liao, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/935,166

(22) Filed: Jul. 21, 2020

(65) Prior Publication Data

US 2021/0090827 A1 Mar. 25, 2021

Related U.S. Application Data

(60) Provisional application No. 62/903,766, filed on Sep. 21, 2019.

(30) Foreign Application Priority Data

Jun. 3, 2020 (CN) .......................... 202010494219.7

(51) Int. Cl.
*H01H 13/705* (2006.01)
*H01H 3/12* (2006.01)
(Continued)

(52) U.S. Cl.
CPC ......... *H01H 13/705* (2013.01); *G06F 3/0213* (2013.01); *H01H 3/122* (2013.01);
(Continued)

(58) Field of Classification Search
CPC .. H01H 13/7065; H01H 13/703; H01H 3/122; H01H 3/125; H01H 13/14;
(Continued)

(56) References Cited

U.S. PATENT DOCUMENTS 10,373,779 B2 * 8/2019 Liao ..................... H01H 13/705
10,950,394 B2 * 3/2021 Liao ..................... H01H 13/14
(Continued)

FOREIGN PATENT DOCUMENTS

| CN | 104409259 | 3/2015 |
| CN | 105655180 | 6/2016 |

OTHER PUBLICATIONS

"Office Action of China Counterpart Application", dated Dec. 24, 2021, p. 1-p. 7.

*Primary Examiner* — Lheiren Mae A Caroc
(74) *Attorney, Agent, or Firm* — JCIPRNET (57) ABSTRACT

A key structure includes a base plate, a key cap, a supporting member, a link member, and a buffer member. The base plate includes a body portion and a protrusion portion protruding upward from the body portion. The body portion has an accommodating hole, the accommodating hole corresponds to the protrusion portion, and the protrusion portion has an opening. The key cap is disposed above the base plate. The supporting member is disposed between the key cap and the base plate. The link member includes a main body portion and an end portion. The main body portion is pivotally connected to the key cap, and the end portion is disposed at the opening of the protrusion portion. The buffer member is located below the end portion, and the end portion leans against the buffer member.

5 Claims, 9 Drawing Sheets

(51) Int. Cl.
*H01H 9/02* (2006.01)
*H01H 13/12* (2006.01)
*H01H 21/24* (2006.01)
*H01H 21/36* (2006.01)
*G06F 3/02* (2006.01)
*H01H 13/703* (2006.01)
*H01H 13/7065* (2006.01)

(52) U.S. Cl.
CPC .............. *H01H 3/125* (2013.01); *H01H 9/02* (2013.01); *H01H 13/12* (2013.01); *H01H 13/703* (2013.01); *H01H 13/7065* (2013.01); *H01H 21/24* (2013.01); *H01H 21/36* (2013.01); *H01H 2009/0278* (2013.01)

(58) Field of Classification Search
CPC ........ H01H 13/705; H01H 3/12; H01H 13/70; H01H 2237/00; H01H 13/20; H01H 13/00; H01H 13/10; H01H 13/12; H01H 13/02; H01H 13/26; H01H 13/50; H01H 13/702; H01H 13/704; H01H 13/506; H01H 13/52; H01H 13/7006; H01H 13/7057; H01H 13/84; H01H 13/85; H01H 2211/00; H01H 2209/046; H01H 2209/068; H01H 2209/074; H01H 2209/024; H01H 2209/03; H01H 2209/052; H01H 2215/008; H01H 2215/00; H01H 2215/004; H01H 2215/03; H01H 2221/002; H01H 2227/008; H01H 2221/062; H01H 3/00; H01H 3/02; H01H 3/54; H01H 3/32; H01H 3/46; H01H 3/60; H01H 2227/00; H01H 2227/004; H01H 2227/006; H01H 9/02; H01H 21/24; H01H 21/36; G06F 3/0202; G06F 3/02
USPC .......................................... 200/341, 344, 345
See application file for complete search history.

(56) References Cited

U.S. PATENT DOCUMENTS

| 2007/0165368 | A1* | 7/2007 | Hsu | .................. G06F 3/0202 |
| | | | | 361/679.08 |
| 2018/0053606 | A1* | 2/2018 | Liao | .................. H01H 3/125 |
| 2018/0337005 | A1* | 11/2018 | Jhuang | .............. H01H 13/7013 |
| 2019/0096604 | A1* | 3/2019 | Yen | .................. H01H 13/705 |
| 2020/0335289 | A1* | 10/2020 | Cheng | .................. H01H 13/14 |

* cited by examiner

KEY STRUCTURE

CROSS-REFERENCE TO RELATED APPLICATION

This application claims the priority benefits of U.S. provisional application Ser. No. 62/903,766, filed on Sep. 21, 2019, and China application serial no. 202010494219.7, filed on Jun. 3, 2020. The entirety of each of the above-mentioned patent applications is hereby incorporated by reference herein and made a part of this specification.

BACKGROUND

1. Technical Field

The disclosure relates to a key structure, and in particular, relates to a key structure that can reduce noise during use.

2. Description of Related Art

A keyboard is an input device allowing tapping with hands. In order to enable a user to use the keyboard freely, a link member is usually disposed in a long key structure (such as a multiple-width key). The configuration of the link member not only can improve the structural strength of the key cap, but also allows the key cap to move up and down relative to a metal base plate through the link member while maintaining the overall balance of the keyboard. However, when the key cap is moved up and down, the link member collides with the metal base plate to generate noise. In addition, a joint between the link member and the metal base plate also generates noise due to friction. Therefore, the problem of noise generated during tapping of the key structure needs to be further improved.

SUMMARY

The disclosure is directed to a key structure that can reduce noise generated during tapping.

According to an embodiment of the disclosure, the key structure includes a base plate, a key cap, a supporting member, a link member, and a buffer member. The base plate includes a body portion and a protrusion portion protruding upward from the body portion. The body portion has an accommodating hole, the accommodating hole corresponds to the protrusion portion, and the protrusion portion has an opening. The key cap is disposed above the base plate. The supporting member is disposed between the key cap and the base plate. The link member includes a main body portion and an end portion. The main body portion is pivotally connected to the key cap, and the end portion is disposed at the opening of the protrusion portion. The buffer member is located below the end portion, and the end portion leans against the buffer member.

In the key structure according to an embodiment of the disclosure, orthographic projection of the end portion of the link member on the base plate does not overlap the body portion.

In the key structure according to an embodiment of the disclosure, the body portion further has a slotted hole, and the protrusion portion is located between the accommodating hole and the slotted hole.

In the key structure according to an embodiment of the disclosure, the buffer member fills the accommodating hole and the slotted hole.

In the key structure according to an embodiment of the disclosure, an orthographic projection of the end portion of the link member on the base plate overlaps the body portion, and the buffer member is located between the end portion and the body portion.

In the key structure according to an embodiment of the disclosure, the buffer member exposes the accommodating hole.

In the key structure according to an embodiment of the disclosure, the buffer member extends to cover the accommodating hole.

In the key structure according to an embodiment of the disclosure, the buffer member is a part of a membrane circuit board.

In the key structure according to an embodiment of the disclosure, the key structure further includes: a reinforcing member and an elastic member. The reinforcing member is disposed at a bottom surface of the key cap. The elastic member is disposed between the key cap and the base plate and leans against the reinforcing member.

In the key structure according to an embodiment of the disclosure, the key cap includes a plurality of engaging portions. The plurality of engaging portions are engaged with the supporting member. The reinforcing member has a plurality of positioning holes and the plurality of engaging portions are exposed from the positioning holes.

In the key structure according to an embodiment of the disclosure, the reinforcing member covers at least 50% of an area of the bottom surface of the key cap.

In the key structure according to an embodiment of the disclosure, the reinforcing member includes a first reinforcing member and a second reinforcing member, the first reinforcing member is disposed at the bottom surface of the key cap, the second reinforcing member is disposed on the first reinforcing member, and an area of the first reinforcing member is greater than an area of the second reinforcing member.

Based on the above, in the design of the key structure of the disclosure, the buffer member is located below the end portion of the link member, and the end portion of the link member leans against the buffer member. The configuration of the buffer member provides a buffer function for the end portion of the link member. Therefore, when the user taps the key structure, the generation of noise can be avoided, thereby achieving noise reduction.

To make the features and advantages of the disclosure clear and easy to understand, the following gives a detailed description of embodiments with reference to accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Exemplary embodiments of the disclosure are described in detail, and examples of the exemplary embodiments are shown in the accompanying drawings. Whenever possible, the same element symbols are used in the drawings and descriptions to indicate the same or similar parts.

Figure 1A:
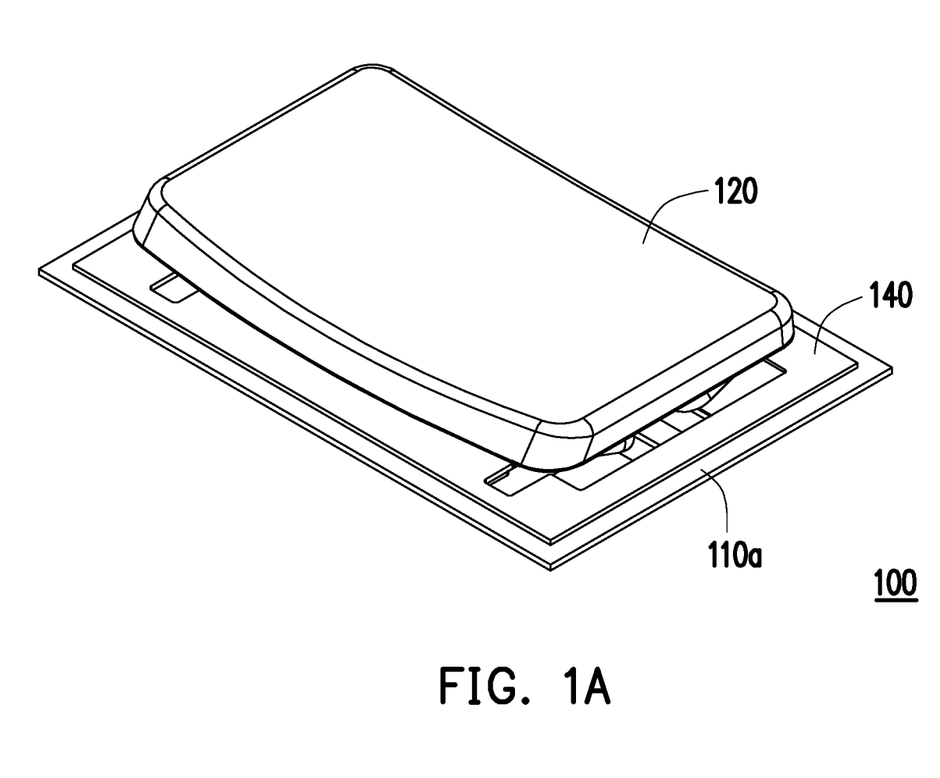
FIG. 1A is a schematic three-dimensional diagram of a key structure according to an embodiment of the disclosure.
Figure 1B:
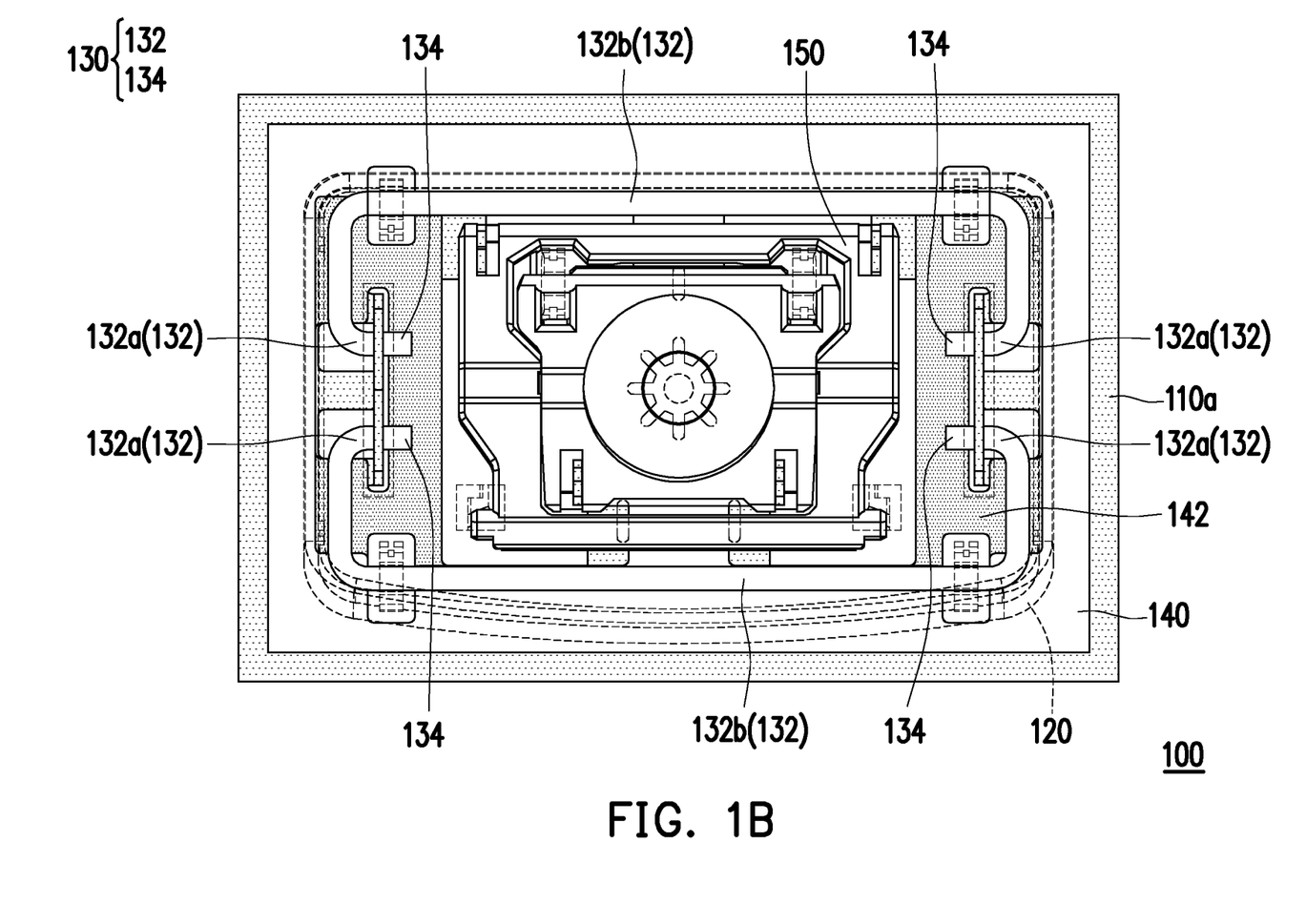
FIG. 1B is a schematic top view of the key structure of FIG. 1A.
Figure 1C:
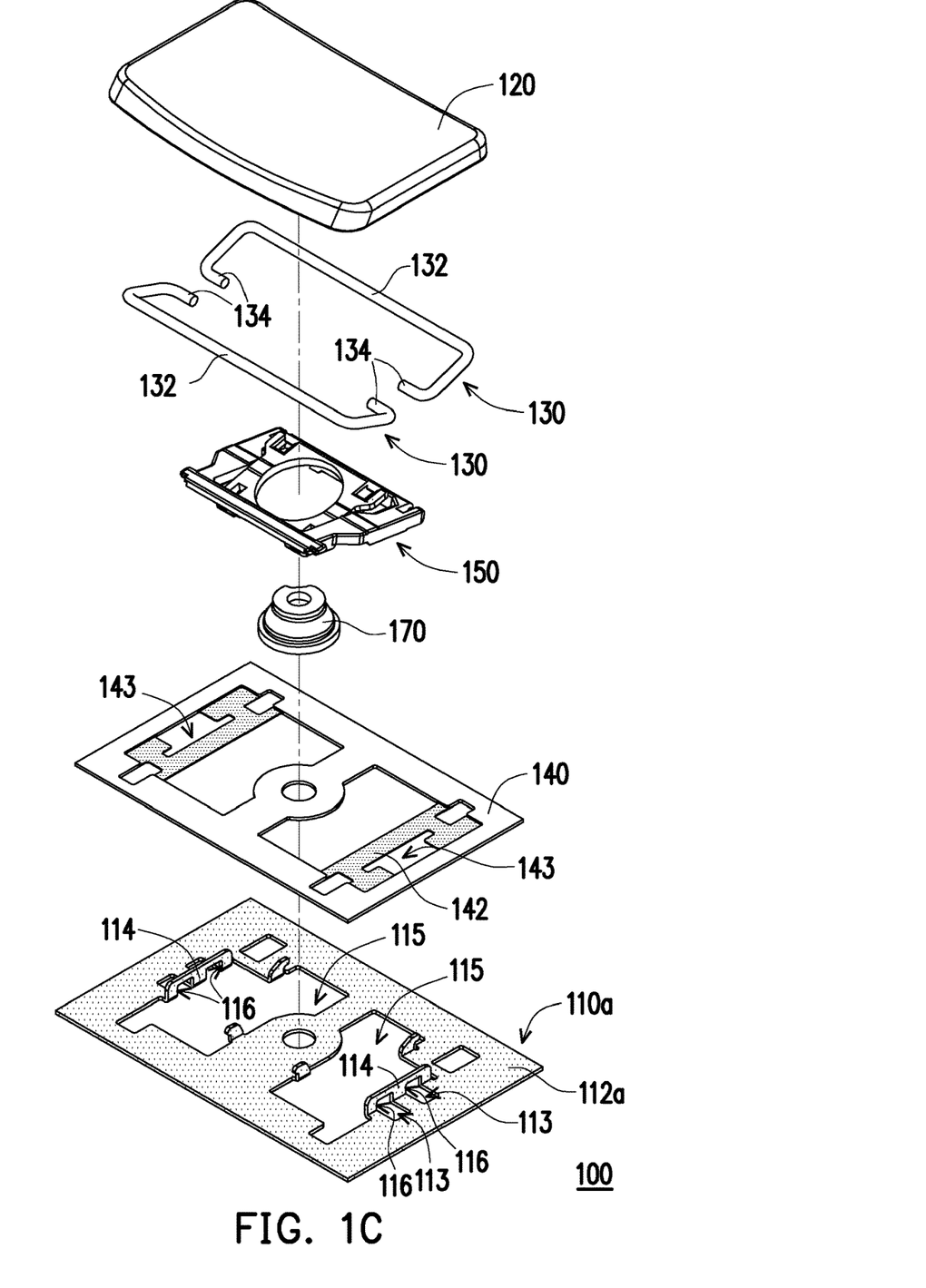
FIG. 1C is a schematic three-dimensional exploded view of the key structure of FIG. 1A.
Figure 1D:
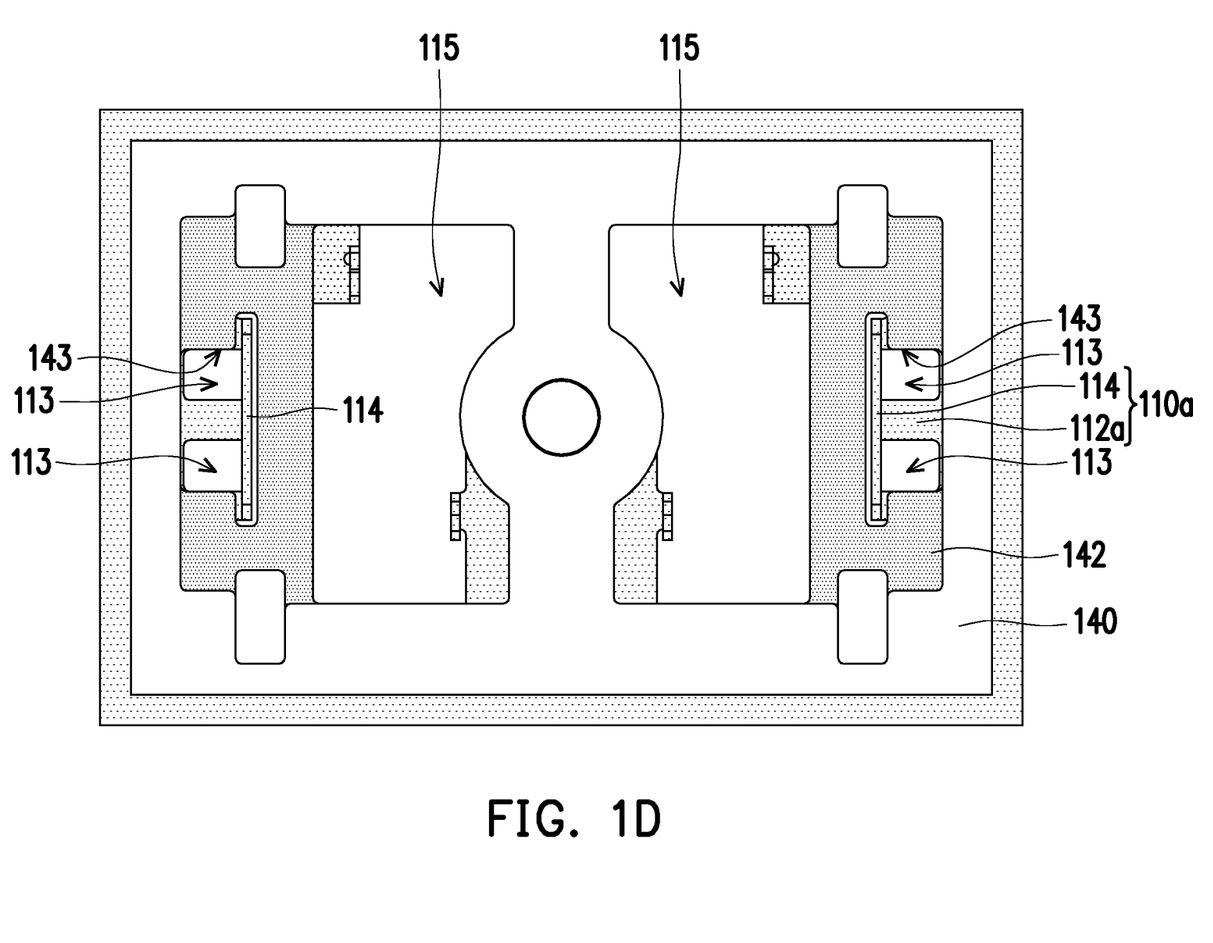
FIG. 1D is a schematic top view of a buffer member and a base plate, after assembly, of the key structure of FIG. 1A.

FIG. 1A is a schematic three-dimensional diagram of a key structure according to an embodiment of the disclosure. FIG. 1B is a schematic top view of the key structure of FIG. 1A. FIG. 1C is a schematic three-dimensional exploded view of the key structure of FIG. 1A. FIG. 1D is a schematic top view of a buffer member and a base plate, after assembly, of the key structure of FIG. 1A.

Referring to FIG. 1A, FIG. 1B, FIG. 1C, and FIG. 1D, in the present embodiment, a key structure 100 includes a base plate 110a, a key cap 120, a supporting member 150, a link member 130, and a buffer member 142. The base plate 110a includes a body portion 112a and a protrusion portion 114 protruding upward from the body portion 112a. Protruding upward herein means that the protrusion portion 114 extends from the body portion 112a toward the key cap 120. That is to say, the present embodiment does not limited to t the protrusion portion 114 to be substantially perpendicular to the body portion 112a, and an angle between the protrusion portion 114 and the body portion 112a may also be less than 90 degrees or greater than 90 degrees. Secondly, the body portion 112a has an accommodating hole 113, the accommodating hole 113 corresponds to the protrusion portion 114, and the protrusion portion 114 has an opening 116. In the present embodiment, the accommodating hole 113 is in communication with the opening 116. The key cap 120 is disposed above the base plate 110a, and the supporting member 150 is disposed between the key cap 120 and the base plate 110a. The link member 130 includes a main body portion 132 and an end portion 134. The main body portion 132 is pivotally connected to the key cap 120, and the end portion 134 is disposed at the opening 116 of the protrusion portion 114. The buffer member 142 is located below the end portion 134 of the link member 130, and the end portion 134 leans against the buffer member 142. The buffer member 142 is provided to provide a buffer function to the end portion 134 of the link member 130. Therefore, when the user taps the key structure 100, the generation of noise can be avoided, thereby achieving noise reduction.

Figure 1E:
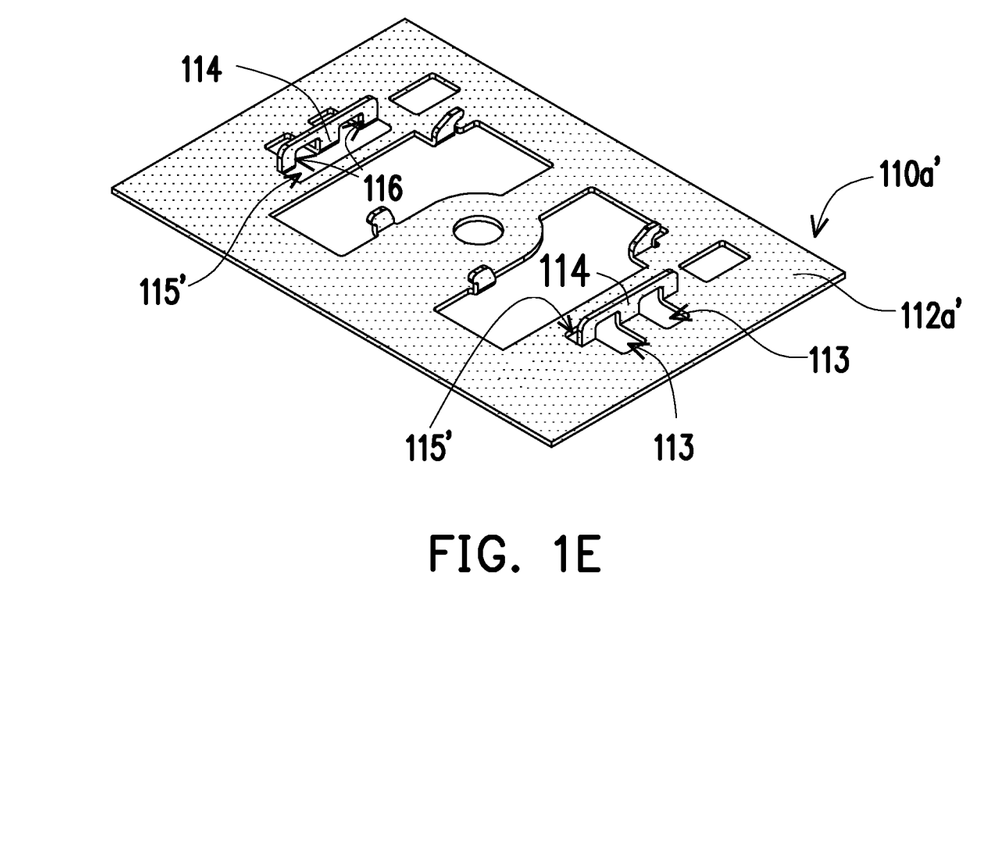
FIG. 1E is a schematic three-dimensional diagram of a base plate of a key structure according to another embodiment of the disclosure.

In detail, the key structure 100 of the present embodiment is a long multiple-width key, for example, a key with a large size such as a space key, an Enter key, a Shift key, and a backspace key in a keyboard. The base plate 110a is, for example, a metal base plate, but is not limited thereto. The body portion 112a of the base plate 110a of the present embodiment further has a slotted hole 115 and the protrusion portion 114 is located between the accommodating hole 113 and the slotted hole 115. In the present embodiment, an area of the slotted hole 115 is larger than an area of the accommodating hole 113, but the disclosure is not limited thereto. In another embodiment, referring to FIG. 1E, a body portion 112a' of a base plate 110a' has a slotted hole 115', and the slotted hole 115' and the accommodating hole 113 are surrounded by the body portion 112a'. Herein, the accommodating holes 113 are located on a left side and a right side of the body portion 112a, and two accommodating holes 113 are disposed on each side. That is to say, there are four accommodating holes 113, but the disclosure is not limited thereto. In other embodiments not shown, one accommodating hole may be disposed on each of the left side and the right side of the body portion, that is, there are two accommodating holes, which still belongs to the scope of protection of the disclosure. The number of the slotted holes 115 is two, and they are arranged in a mirror. Herein, the accommodating hole 113 and the slotted hole 115 communicate with each other.

In addition, the number of the link members 130 in the present embodiment is two. The main body portion 132 of each link member 130 has two parallel sections 132a parallel to each other and a horizontal section 132b connecting the two parallel sections 132a. The number of the end portions 134 of each link member 130 is two, which are respectively connected to the two ends of the main body portion 132, that is, connected to the two parallel sections 132a. The two link members 130 are disposed above the base plate 110a. A material of the link member 130 is, for example, metal, but is not limited thereto. Herein, an orthographic projection of the end portion 134 of the link member 130 on the base plate 110a does not overlap the body portion 112a. Further, the orthographic projection of the end portion 134 of the link member 130 on the base plate 110a in the present embodiment is located in the slotted hole 115. In addition, it is worth mentioning that the metal link member 130 can be covered or coated on the end portion 134 by plastic or other buffer materials to further achieve the effect of noise reduction.

In addition, in the present embodiment, the buffer member 142 is located at least below the end portion 134 of the link member 130. In more detail, in the present embodiment, the buffer member 142 is substantially a part of a membrane circuit board 140 and is disposed on a left side and a right side of the membrane circuit board 140. Generally speaking, the membrane circuit board 140 at leas includes a three-layer structure, and the buffer member 142 can be one or two layers in the three-layer structure layer. A material of the buffer member 142 is, for example, polyethylene terephthalate (PET), but is not limited thereto. Furthermore, the buffer member 142 of the present embodiment has a yield hole 143. The yield hole 143 is disposed corresponding to the accommodating hole 113 and the protrusion portion 114 of the base plate 110a. Therefore, the buffer member 142 of the present embodiment can expose the accommodating hole 113. In other words, the buffer member 142 does not cover the accommodating hole 113, or the buffer member 142 only partially covers the accommodating hole 113. Herein, the number of the yield holes 143 is two, but the disclosure is not limited thereto. As shown in FIG. 1B and FIG. 1D, in the present embodiment, the part of the buffer member 142 corresponding to the end portion 134 of the link member 130 is substantially suspended, and there is no the body portion 112a of the base plate 110a below the this part.

Furthermore, the supporting member 150 in this example is, for example, a scissor-mechanism. For example, when a finger of a user presses the key cap 120 of the key structure 100, the key cap 120 of the key structure 100 may be displaced according to the pressing force. When the finger of the user leaves the key cap 120 of the key structure 100, the supporting member 150 of the key structure 100 provides an elastic force, so that the key cap 120 of the key structure 100 may be restored to an original position. In addition, the key structure 100 in this example further includes an elastic member 170. The elastic member 170 is located between the key cap 120 and the base plate 110a, and the supporting member 150 surrounds the elastic member 170.

In short, in the design of the key structure 100 of the present embodiment, the buffer member 142 is located at least below the end portion 134 of the link member 130, and the end portion 134 of the link member 130 leans against the buffer member 142. The buffer member 142 is provided to provide a buffer function to the end portion 134 of the link member 130. Therefore, when the user taps the key structure 100, the generation of noise can be avoided, thereby achieving noise reduction.

It should be noted herein that in the following embodiments, reference numerals and some content of the foregoing embodiments are used, and same reference numerals are used to represent same or similar elements, and descriptions about same technical content are omitted. Reference may be made to the foregoing embodiments for the omitted portion, and the descriptions thereof are omitted in the following embodiments.

Figure 2:
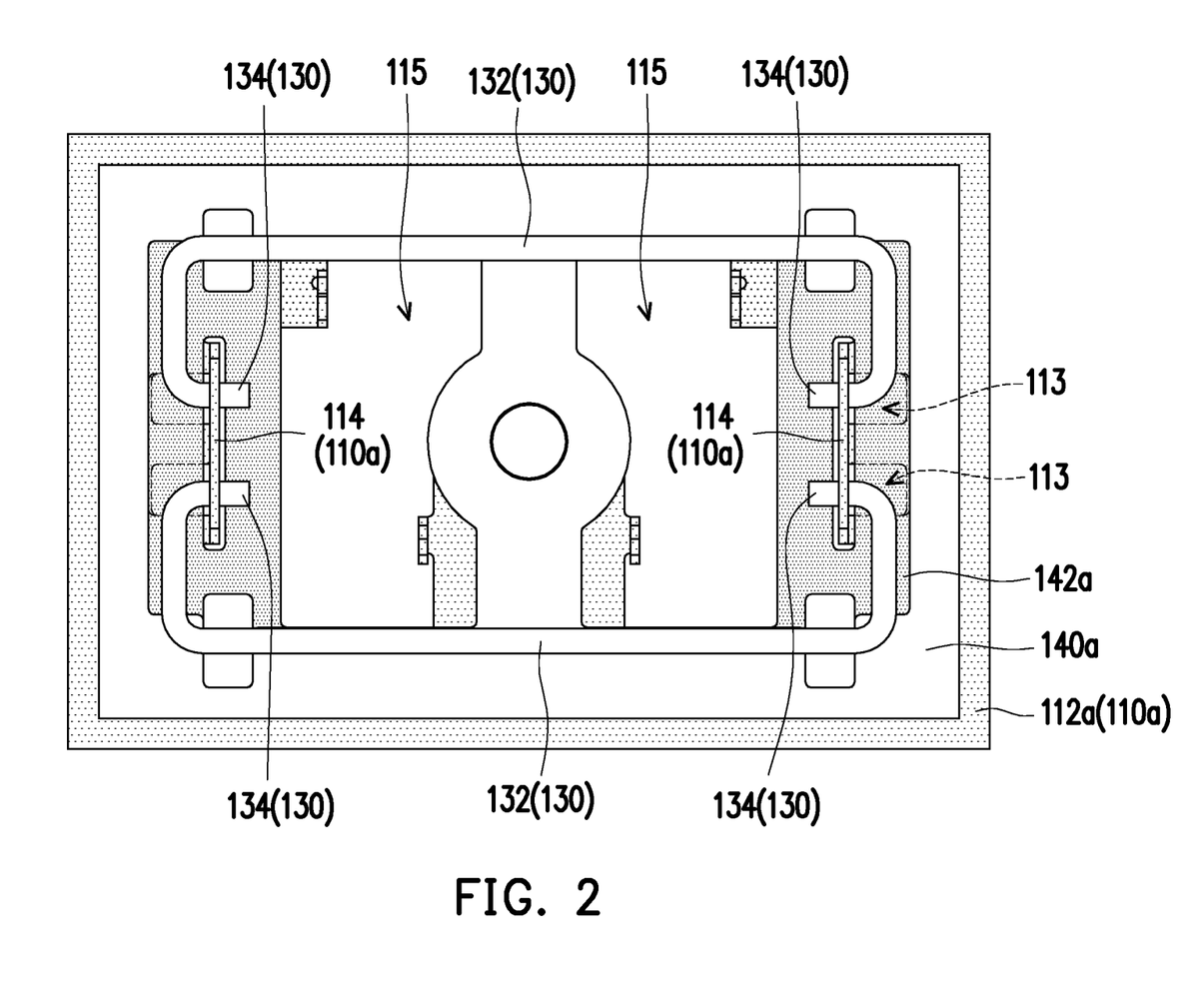
FIG. 2 is a schematic top view of a base plate, a link member, and a buffer member of a key structure according to another embodiment of the disclosure.

FIG. 2 is a schematic top view of a base plate, a link member, and a buffer member of a key structure according to another embodiment of the disclosure. Referring to both FIG. 1B and FIG. 2, a buffer member 142a of the present embodiment is similar to the buffer member 142 of FIG. 1B, and a difference between the two buffer members lies in that: the buffer member 142a of the present embodiment is a part of a membrane circuit board 140a, and the buffer member 142a extends to cover the accommodating hole 113 in addition to the end portion 134 of the link member 130. In other words, a periphery of the protrusion portion 114 of the base plate 110a is surrounded by the buffer member 142a. Since the end portion 134 of the link member 130 leans against the buffer member 142a, the buffer member 142a provides a buffer function to achieve soft-landing of the end portion 134 of the link member 130 so as to prevent generation of noise, thereby achieving noise reduction.

Figure 3:
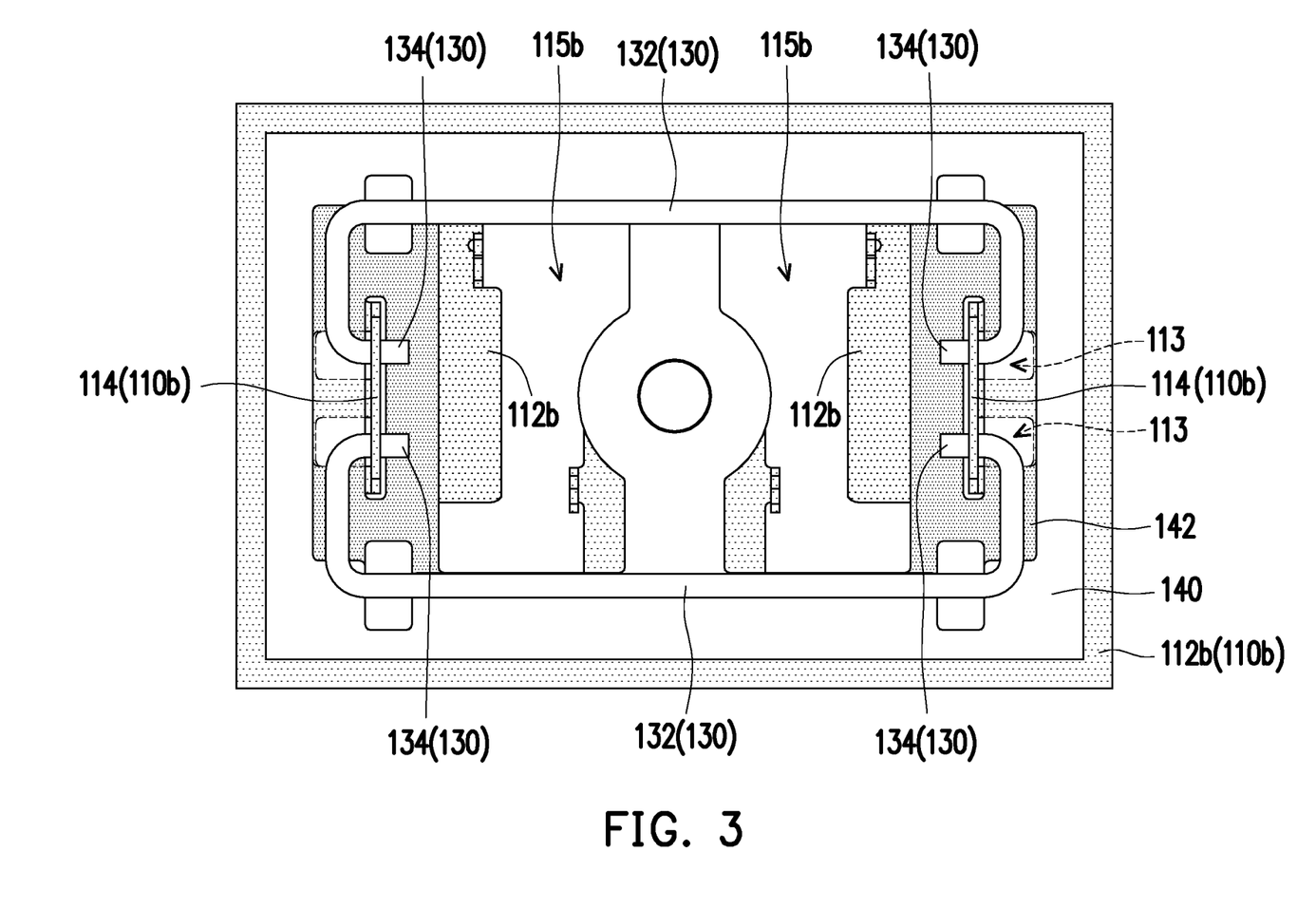
FIG. 3 is a schematic top view of a base plate, a link member, and a buffer member of a key structure according to still another embodiment of the disclosure.

FIG. 3 is a schematic top view of a base plate, a link member, and a buffer member of a key structure according to still another embodiment of the disclosure. Referring to both FIG. 1D and FIG. 3, a base plate 110b of the present embodiment is similar to the base plate 110a of FIG. 1D, and a difference between the two base plates lies in that: a main body portion 112b of the base plate 110b of the present embodiment further extends between the accommodating hole 113 and an slotted hole 115b. In other words, the accommodating hole 113 is not in communication with the slotted hole 115b. Herein, an orthographic projection of an end portion 134 of the link member 130 on the base plate 110b overlaps the body portion 112b, and the buffer member 142 is located between the end portion 134 of the link member 130 and the body portion 112b. Since the end portion 134 of the link member 130 leans against the buffer member 142, the buffer member 142 provides a buffer function to prevent the end portion 134 of the link member 130 from directly contacting the main body portion 112b of the base plate 110b, so as to prevent generation of noise due to collision with the base plate 110b, thereby achieving noise reduction.

Figure 4:
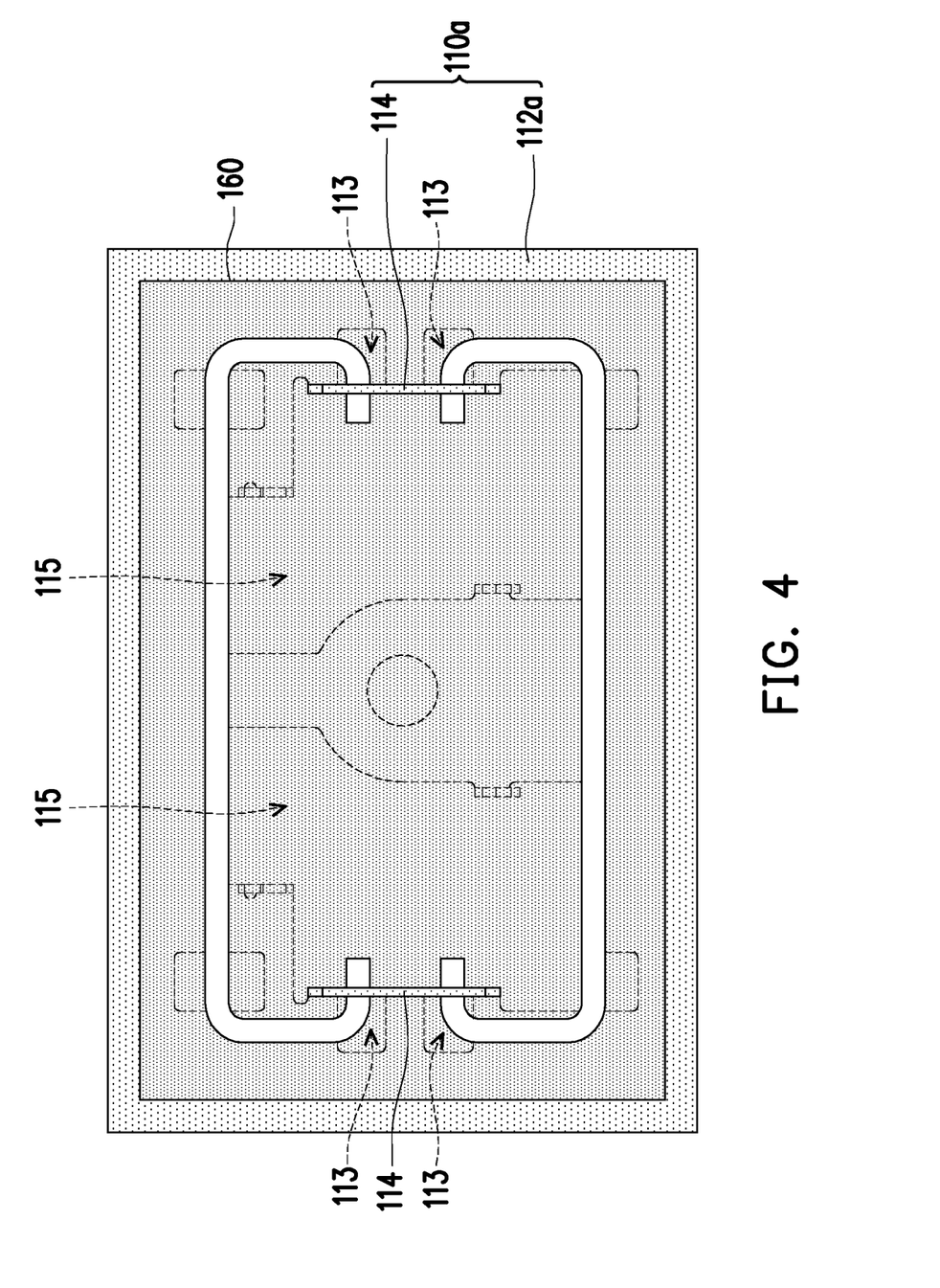
FIG. 4 is a schematic top view of a base plate, a link member, and a buffer member of a key structure according to yet another embodiment of the disclosure.

FIG. 4 is a schematic top view of a base plate, a link member, and a buffer member of a key structure according to yet another embodiment of the disclosure. Referring to both FIG. 1B and FIG. 4, a buffer member 160 of the present embodiment is similar to the buffer member 142 of FIG. 1B, and a difference between the two buffer members lies in that: the buffer member 160 of the present embodiment is formed by injection molding and directly combined with a base plate 110a, and the buffer member 160 is filled in the accommodating hole 113 and the slotted hole 115. In the present embodiment, the accommodating hole 113 and the slotted hole 115 are filled with the buffer member 160. However, in other embodiments, the accommodating hole 113 and only a part of the slotted hole 115 may be filled with the buffer member 160, or only a part of the accommodating hole 113 and a part of the slotted hole 115 are filled with the buffer member 160. In addition, a material of the buffer member 160 is plastic, for example, polyethylene terephthalate (PET), but is not limited thereto. Since the end portion 134 of the link member 130 leans against the buffer member 142, the buffer member 142 provides a buffer function to prevent the end portion 134 of the link member 130 from directly contacting the main body portion 112a of the base plate 110a, so as to prevent generation of noise due to collision with the base plate 110a, thereby achieving noise reduction. In addition, it is worth mentioning that the implementation in which the buffer member 160 is filled in the accommodating hole 113 and the slotted hole 115' by injection molding may also be applied to the structure of the base plate 110a' shown in FIG. 1E.

Figure 5:
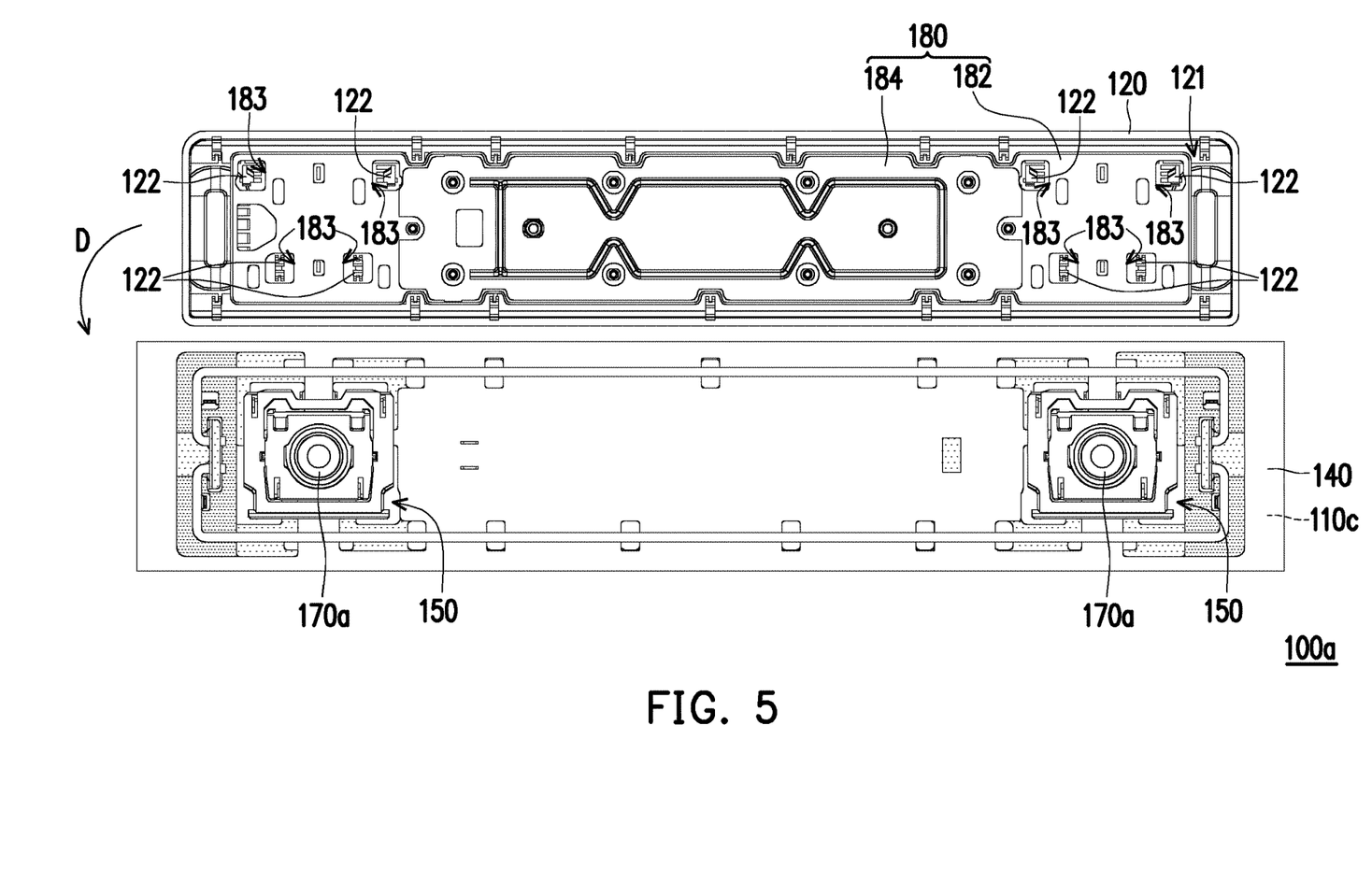
FIG. 5 is a schematic diagram of a key structure according to another embodiment of the disclosure.

FIG. 5 is a schematic diagram of a key structure according to another embodiment of the disclosure. For convenience of explanation, a reinforcing member 180 and a key cap 120 in FIG. 5 are turned over relative to a base plate 110c and is laid flat on a side of the base plate 110c. Therefore, the reinforcing member 180 and the key cap 120 can be assembled onto the base plate 110c along an overturn direction D.

Referring to FIG. 5, a key structure 100a of the present embodiment further includes a reinforcing member 180 and an elastic member 170a. The reinforcing member 180 is disposed on a bottom surface 121 of the key cap 120, and the elastic member 170a is disposed between the key cap 120 and the base plate 110c and leans against the reinforcing member 180. Herein, for example, the key structure 100a has two elastic members 170a. In other embodiments, other numbers of elastic members 170a may be used. For example, only one elastic member 170a is used, and the elastic member 170a is disposed between the two supporting members 150, or three elastic members 170a are used, and the elastic members 170a are disposed in the two supporting members 150 and between the two supporting members 150, respectively. Furthermore, the key cap 120 includes a plurality of engaging portions 122. The engaging portions 122 are engaged with the supporting member 150. In the present embodiment, the reinforcing member 180 includes a first reinforcing member 182 and a second reinforcing member 184. When the device is installed, the first reinforcing member 182 with a larger coverage area is first disposed on the bottom surface 121 of the key cap 120, and then the second reinforcing member 184 with a smaller coverage area is disposed on the first reinforcing member 182, so that the structural strength of the key cap 120 can be further increased by such a stacked design. The first reinforcing member 182 has a plurality of positioning holes 183, and the engaging portions 122 are exposed from the positioning holes 183. The purpose of the reinforcing member 180 is to increase the structural strength of the key cap 120 to reduce or prevent shaking when the key cap 120 is pressed, so as to reduce the impact noise caused by the shaking. Herein, a material of the reinforcing member 180 is, for example, metal or reinforced plastic, but is not limited thereto. In order to effectively increase the structural strength of the key cap 120, the reinforcing member 180 shields or covers at least 50% of an area of the bottom surface 121 of the key cap 120, preferably at least 75% of the area of the bottom surface 121 of the key cap 120. In other embodiments, the reinforcing member 180 may be a single member, or is formed by combining or stacking a plurality of members according to actual needs.

Based on the above, in the design of the key structure of the disclosure, the buffer member is located at least below the end portion of the link member, and the end portion of the link member leans against the buffer member. The buffer member is provided to provide a buffer function to the end portion of the link member. Therefore, when the user taps the key structure, the generation of noise can be avoided, thereby achieving noise reduction.

Finally, it should be noted that the foregoing embodiments are merely used for describing the technical solutions of the disclosure, but are not intended to limit the disclosure. Although the disclosure is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the disclosure.

What is claimed is:

1. A key structure, comprising:
   a base plate comprising a body portion and a protrusion portion protruding upward from the body portion, wherein the body portion has an accommodating hole corresponding to the protrusion portion, and the protrusion portion has an opening;
   a key cap disposed above the base plate;
   a supporting member disposed between the key cap and the base plate;
   a link member comprising a main body portion and an end portion, wherein the main body portion is pivotally connected to the key cap; and
   a buffer member located below the end portion, wherein the end portion leans against the buffer member,
   wherein the body portion further has a slotted hole, the protrusion portion is located between the accommodating hole and the slotted hole, and the accommodating hole is in communication with the opening and the slotted hole,
   wherein the buffer member fills the accommodating hole and the slotted hole,
   wherein an orthographic projection of the end portion of the link member on the base plate does not overlap the body portion.

2. The key structure according to claim 1, further comprising:
   a reinforcing member disposed at a bottom surface of the key cap; and
   an elastic member disposed between the key cap and the base plate and leaning against the reinforcing member.

3. The key structure according to claim 2, wherein the key cap comprises a plurality of engaging portions, the plurality of engaging portions are engaged with the supporting member, the reinforcing member has a plurality of positioning holes, and the plurality of engaging portions are exposed from the plurality of positioning holes.

4. The key structure according to claim 2, wherein the reinforcing member covers at least 50% of an area of the bottom surface of the key cap.

5. The key structure according to claim 2, wherein the reinforcing member comprises a first reinforcing member and a second reinforcing member, the first reinforcing member is disposed on the bottom surface of the key cap, the second reinforcing member is disposed on the first reinforcing member, and an area of the first reinforcing member is greater than an area of the second reinforcing member.

* * * * *